US006969030B1

(12) United States Patent
Jones et al.

(10) Patent No.: US 6,969,030 B1
(45) Date of Patent: Nov. 29, 2005

(54) SPACECRAFT DOCKING MECHANISM (75) Inventors: Howard Martin Jones, Caledon East (CA); Pat Malaviarachchi, Toronto (CA); Andrew Charles MacKenzie Allen, Toronto (CA); Mariano Ficocelli, Woodbridge (CA); Geoffrey William Frederick Sprawson, Maple (CA)

(73) Assignee: Macdonald Dettwiler Space and Associates Inc., Brampton (CA)

( * ) Notice: Subject to any disclaimer, the term of this patent is extended or adjusted under 35 U.S.C. 154(b) by 0 days.

(21) Appl. No.: 10/890,513

(22) Filed: Jul. 14, 2004

(51) Int. Cl.$^7$ .............................. B64G 1/64
(52) U.S. Cl. .................. 244/161; 244/155; 244/135 A
(58) Field of Search ................ 244/161, 115, 116, 244/135 A (56) References Cited

U.S. PATENT DOCUMENTS

| | | | |
|---|---|---|---|
| 3,478,986 A * | 11/1969 | Fogarty ...................... 244/159 |
| 3,508,723 A | 4/1970 | Warren et al. |
| 4,177,964 A * | 12/1979 | Hujsak et al. ............... 244/161 |
| 4,195,804 A * | 4/1980 | Hujsak et al. ............... 244/161 |
| 4,500,057 A * | 2/1985 | Duwelz ....................... 244/161 |
| 4,588,150 A | 5/1986 | Bock et al. |
| 4,664,344 A | 5/1987 | Harwell et al. |
| 4,890,918 A * | 1/1990 | Monford ...................... 356/150 |
| 5,005,786 A | 4/1991 | Okamoto et al. |
| 5,364,046 A | 11/1994 | Dobbs et al. |
| 5,511,748 A | 4/1996 | Scott |
| 5,735,488 A | 4/1998 | Schneider |
| 5,803,407 A | 9/1998 | Scott |
| 5,806,802 A | 9/1998 | Scott |
| 6,017,000 A | 1/2000 | Scott |
| 6,254,035 B1 * | 7/2001 | Howard et al. ............. 244/161 |
| 6,299,107 B1 | 10/2001 | Kong et al. |
| 6,330,987 B1 | 12/2001 | Scott |
| 6,484,973 B1 | 11/2002 | Scott |
| 6,523,784 B2 * | 2/2003 | Steinsiek et al. ........... 244/161 |
| 6,742,745 B2 * | 6/2004 | Tchoryk et al. ............. 244/161 |
| 2002/0063188 A1 | 5/2002 | Steinsick et al. |

* cited by examiner

*Primary Examiner*—Galen Barefoot
(74) *Attorney, Agent, or Firm*—Lynn C. Schumacher; Hill & Schumacher (57) ABSTRACT

The present invention provides a docking mechanism that is capable of interfacing with Apogee Boost Motors (ABM) including Liquid Apogee Motors (LAM) of the satellite being captured to allow a servicing spacecraft to dock with a satellite that has no special docking features. The docking mechanism includes a compliant probe with spring-loaded fingers at its tip which is inserted into the LAM by the approach motion of the servicer spacecraft. When the probe tip has passed beyond the throat of the LAM the finger extend to trap the LAM on the probe thus achieving capture. The rigidization stage of docking is achieved by retracting the probe to pull the two spacecraft together. The docking mechanism includes abutment pads which interface with the launcher interface ring of the client spacecraft. With the preload applied by the probe retraction mechanism reacted through these pads, the docking mechanism can maintain a rigid docked interface under loads induced by thrusting maneuvers of the combined spacecraft or loads induced by on-orbit servicing operations.

18 Claims, 8 Drawing Sheets

SPACECRAFT DOCKING MECHANISM

FIELD OF INVENTION

This invention relates to a spacecraft docking mechanism for docking of two spacecraft, and more particularly the present invention relates to a docking mechanism capable of interacting with apogee boost motors (ABM) or liquid apogee motors (LAM) on a spacecraft to be serviced.

BACKGROUND OF THE INVENTION

Since 1957, thousands of satellites of various types and for various purposes have been launched into different earth orbits. As these satellites near the end of their projected lives, there are economic incentives to attempt to extend the life of these satellites. Unfortunately, most satellites were never specifically designed to be captured midlife in space and so most commercial satellites have no special docking features. However, many satellites have either an Apogee Boost Motor (ABM) or a Liquid Apogee Motor (LAM) which includes a generally conical-shaped exhaust nozzle with a throat that narrows and widens. These motors therefore present an opportunity for capture by a servicing satellite if somehow the servicing satellite can be coupled to these motors.

U.S. Pat. No. 3,508,723 issued to Warren et al. is directed to a method and apparatus for securing two spacecraft together which involves the capturing spacecraft to come up behind the target spacecraft being captured and inserting a probe into the rocket engine nozzle of the target spacecraft. The securing device includes gas driven pistons connected to a spring-loaded collar which slides along a rigid boom with the boom having at one end a hemispherical tip which is inserted into the engine nozzle. Locking shoes pivot outwardly once the tip is located inside the nozzle which locks the two ships together.

U.S. Pat. No. 4,588,150 issued to Bock et al. is directed to a docking device for space vehicles and uses a coupling member which is a telescopic rod. At the end of the rod several latch elements project outwardly and backwardly and are spring loaded so that when the end of the rod is inserted into the passageway located in the coupling mechanism of the spacecraft being captured they grip thus preventing withdrawal of the rod.

U.S. Pat. No. 4,664,344 issued to Harwell et al. is directed to an apparatus for capturing spacecraft predominantly for use either by an astronaut in a self-propelled thruster unit to which the device is attached or it may be attached to a space arm operated from the spacecraft. The apparatus includes a probe coaxial with the center of a ring which may be padded to form a cushion when engaged against a separation ring on the spacecraft being captured. The probe includes a slide cover which retains grappling fingers within the probe until the slide cover is retracted once the end of the probe has been inserted into the nozzle throat of the spacecraft ABM. Once the fingers are released they prevent withdrawal of the probe from the nozzle throat.

U.S. Pat. No. 5,735,488 issued to Schneider is directed to an apparatus for coupling two spacecraft which includes a long tube with a bumper at its distal end. A pair of inflatable bladders are located near the bumper and a second pair of bladders are spaced down from the first pair of bladders. The pairs of bladders are spaced a distance apart such that they match the surfaces of the nozzle of the spacecraft being captured. Once the tube is inserted into the nozzle the bladders are inflated thereby securing the two craft together.

U.S. Patent Publication 2002/0063188A1 published May 30, 2002 to Steinsick et al. is directed to an apparatus for recovering a spacecraft and includes a mast or tube described as a telescoping tube that has an adjustable length while being substantially rigid. The distal end of the pipe which engages the spacecraft being captured includes three spreader arms which are connected to the pipe using pivot struts. When the spacecraft is captured the ends of the arms grip a ring located at the coupling point on the spacecraft.

U.S. Pat. No. 6,299,107 B1 issued to Kong et al. is directed to a docking apparatus for coupling spacecraft and uses a spike extended from the capturing craft which is captured by a flexible net located on the craft being captured.

U.S. Pat. No. 5,005,786 issued to Okamoto et al. is directed to a docking and damping mechanism for securing a spacecraft to a space structure. U.S. Pat. No. 5,511,748 issued to Scott is directed to a method of extending the life of a satellite and includes docking an extension spacecraft to the satellite with details of the docking system and refers to the probe and ring assembly disclosed in U.S. Pat. No. 4,664,344 issued to Harwell et al.

U.S. Pat. Nos. 5,806,802, 5,803,407, 6,330,987 B1, 6,017,000 and 6,484,973 B1 all issued to Scott are all related to U.S. Pat. No. 5,511,748 discussed above and discloses the same type of coupling mechanism.

It would be very advantageous to provide a spacecraft docking mechanism that is capable of interfacing with Apogee Boost Motors (ABMs) and liquid apogee motors (LAMs) to allow a servicing spacecraft to dock with a satellite that has no special docking features.

SUMMARY OF INVENTION

The present invention provides a docking mechanism that is capable of interfacing with Apogee Boost Motors (ABM) including Liquid Apogee Motors (LAM) to allow a servicing spacecraft to dock with a satellite that has no special docking features.

The present invention provides a docking mechanism for capturing and coupling a target spacecraft to a servicing spacecraft, the target spacecraft having an apogee motor with a thruster, comprising:

a support frame which is attachable to the servicing spacecraft, and at least one elongate berthing post having first and second ends, the berthing posts being attached to the frame at said first ends, the berthing posts including berthing pads attached to the second ends thereof for contacting the target spacecraft being docked with the servicing spacecraft;

a berthing mechanism attached to the support frame, the berthing mechanism including an extendable stage;

a compliance mechanism mounted on the extendable stage of the berthing mechanism;

a probe including an elongate flexible shaft having first and second ends, a probe head assembly attached to the first end of the longitudinal flexible shaft and the second end of the longitudinal flexible shaft being attached to an abutment plate, the abutment plate being attached to the compliance mechanism, the probe head assembly including fingers extendable laterally therefrom, the compliance mechanism providing kinetic energy absorption and damping of the docking mechanism during capture and coupling of the two spacecraft together for reducing overshooting and undershooting of the probe with respect to the apogee motor; and wherein during capture and coupling of the spacecraft together the servicing spacecraft is positioned behind the thruster of an apogee rocket on the target spacecraft with the extendable stage in the fully extended position, and wherein the probe head assembly is extended into the thruster by movement of the servicing spacecraft and once it has been extended past a throat in the thruster, the fingers are deployed laterally therefrom and the extendable stage of the berthing mechanism is retracted until the berthing pads on the ends of berthing posts contact an interface ring on the target spacecraft.

BRIEF DESCRIPTION OF DRAWINGS

The following is a description, by way of example only, of the spacecraft docking mechanism constructed in accordance with the present invention, reference being had to the accompanying drawings, in which:

FIG. 8b shows a cross sectional view along the line A—A of FIG. 8a.

DETAILED DESCRIPTION OF THE INVENTION

As pointed out in the Background, many satellites have either an Apogee Boost Motor (ABM) or a Liquid Apogee Motor (LAM) and both types of motors include a generally conical-shaped exhaust nozzle with a throat that narrows and widens. These motors therefore present an opportunity for capture by a servicing satellite if somehow the servicing satellite can be coupled to these motors. The present invention provides a device for coupling a servicing spacecraft to both ABMs and LAMS. Hereinafter in describing the present invention the motor on the spacecraft will be referred to as a Liquid Apogee Motor (LAM) but it will be understood that this term refers to both ABMs and LAMs.

Figure 1:
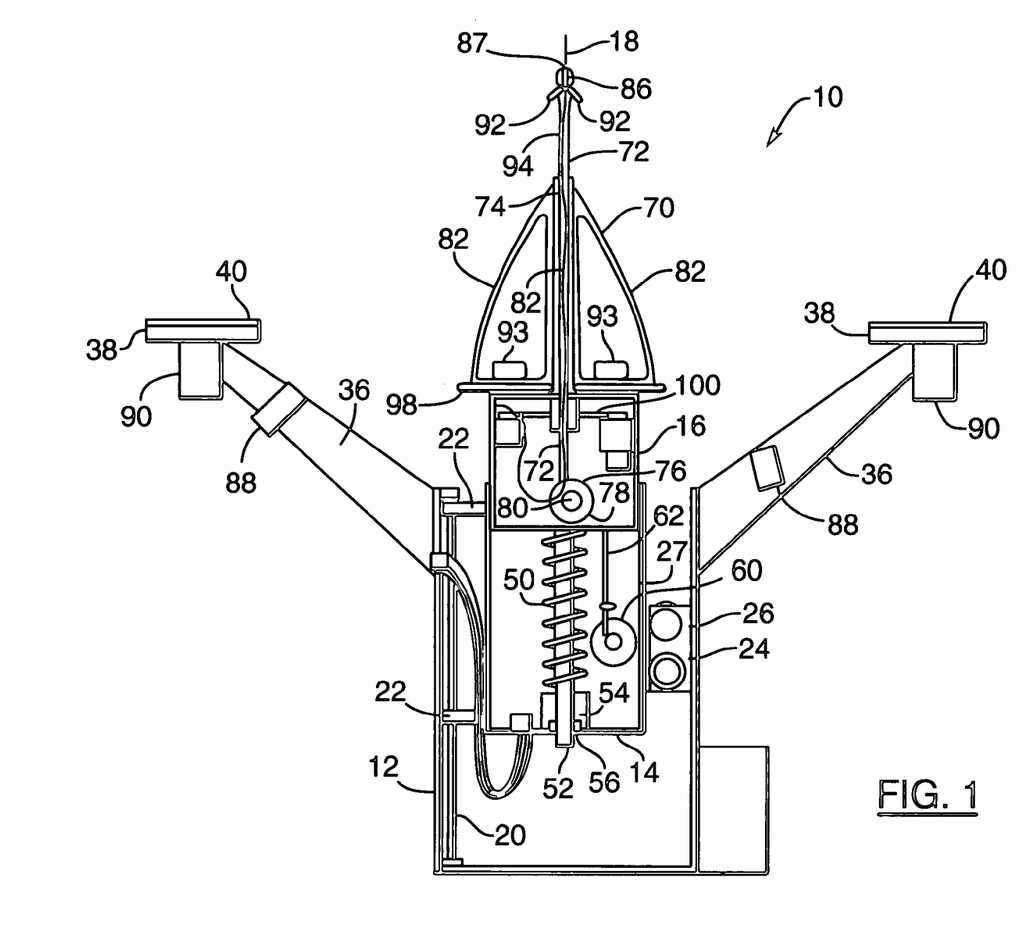
FIG. 1 is a cross sectional elevation view of a docking mechanism.

Referring first to FIG. 1, a spacecraft docking mechanism shown generally at 10 is attached to a servicing spacecraft and includes a first cylindrical housing 12 and a second cylindrical housing 14 of a smaller diameter than housing 12 is concentrically mounted within housing 12. A third cylindrical housing 16 of a smaller diameter than housing 14 is concentrically mounted within housing 14. Cylindrical housing 14 is mounted in cylindrical housing 12 so it can telescope in and out of housing 12 along their respective cylindrical axis 18. Two guide rails 20 (only one shown in FIG. 1) are mounted along the inner wall of cylindrical housing 12 and brackets 22 mounted to housing 14 slide along rail 20 between a retracted position (FIG. 4) and an extended position shown in FIG. 1 of housing 14 with respect to housing 12. A berthing drive mechanism 24 is mounted on the interior of housing 12 for driving housing 14 with respect to housing 12 and includes a motor 26, a gearhead, rack and pinion with the rack 27 mounted on the outer surface of housing 14. Berthing mechanism 24 includes a brake to facilitate smooth movement of housing 14 with respect to housing 12.

The docking mechanism includes a compliant mechanism 60 which includes an eddy current damper with a rack and pinion assembly mounted in housing 16 which is connected to the proximal end of a connecting rod 62. The distal end of rod 62 is connected to the bottom of housing 16. The role of the compliant mechanism 60 is to provide kinetic energy absorption and damping of the docking mechanism during capture and coupling of the two spacecraft and it is integrated with the berthing drive mechanism 24 which is important for preventing overshooting causing the probe to push the satellite away.

Three support arms 36 are attached at the proximal end of each arm to one end of housing 12 and arranged 120° apart around the end of the housing 12 (only two are shown in FIG. 1). A berthing plate 38 is mounted at the distal end of each support arm 36 and a compliant pad 40 is affixed to the outer planar face of each of the berthing plates 38.

A compression spring 50 is mounted on a post 52 which in turn is mounted along the cylindrical axis 18 inside housing 14. Post 52 is mounted in a bearing housing 54 attached to the bottom of housing 14 adjacent to a hole 56 through which one end of post 52 can protrude. The other end of post 52 bears against the bottom of housing 16 for biasing housing 16 with respect to housing 14. Docking mechanism 10 includes an alignment assembly 70 which includes a compliant alignment guide tube 72 aligned in an alignment tube guide 74 along the cylindrical axis 18. Also mounted in the distal end of the compliant tube 72 is a probe head assembly 86 which includes three spring-biased retaining fingers 92 and a lanyard 94 is connected at one end to the fingers 92 and connected at the other end to a probe release mechanism 76 located in housing 16. Lanyard 94 is used to retract the fingers 92 when withdrawing probe head assembly 86 and tube 72 from the Liquid Apogee Motor when the two spacecraft are separating. The probe release drive 76 includes a pulley 78, gear head and motor 80 for retracting the lanyard which closes the fingers 92.

The docking mechanism 10 includes three webbings 82 equidistantly disposed around alignment tube guide 74. Webbings 82 are flexible so they can engage the Liquid Apogee Motor (LAM) of the target spacecraft being captured by the docking mechanism without damaging the rockets. Three light sources 93 are mounted within the webs 82 which are turned on during docking. A boresight camera 87 is mounted on the distal end of guide tube 72 and three monitoring cameras 88 are mounted in one of each of the three support arms 36 and a proximity sensor 90 is mounted on the back surface of each berthing plate 38.

A rigid flange 98 is mounted on the top of housing 16 just below webs 82 and has a hole through its middle through which the tube guide 74 and tube 72 extend. A rigidization drive 100 located inside housing 16 includes a motor, gear head, brake and ball screw.

Docking mechanism 10 is capable of interfacing with Liquid Apogee Motors to allow a servicing spacecraft to dock with a satellite that has no special docking features. The servicer spacecraft to which docking mechanism 10 is deployed from approaches the spacecraft which is being serviced and compliant or flexible tube 72 with the spring-loaded fingers 92 at its tip is inserted into the LAM by the approach motion of the servicer spacecraft. When the probe head assembly 86 has passed beyond the throat of the LAM nozzle the fingers 92 extend to trap the LAM on tube 72 thus achieving capture.

The rigidization stage of docking using mechanism 10 is achieved by retracting the probe 72 to pull the two spacecraft together with fingers 92 extended. The three berthing or abutment pads 38 interface with the launcher interface ring of the target spacecraft. With the preload applied by the probe 72 retraction mechanism reacted through these pads 38 the docking mechanism 10 can maintain a rigid docked interface under loads induced by thrusting maneuvers of the combined spacecraft.

Figure 2:
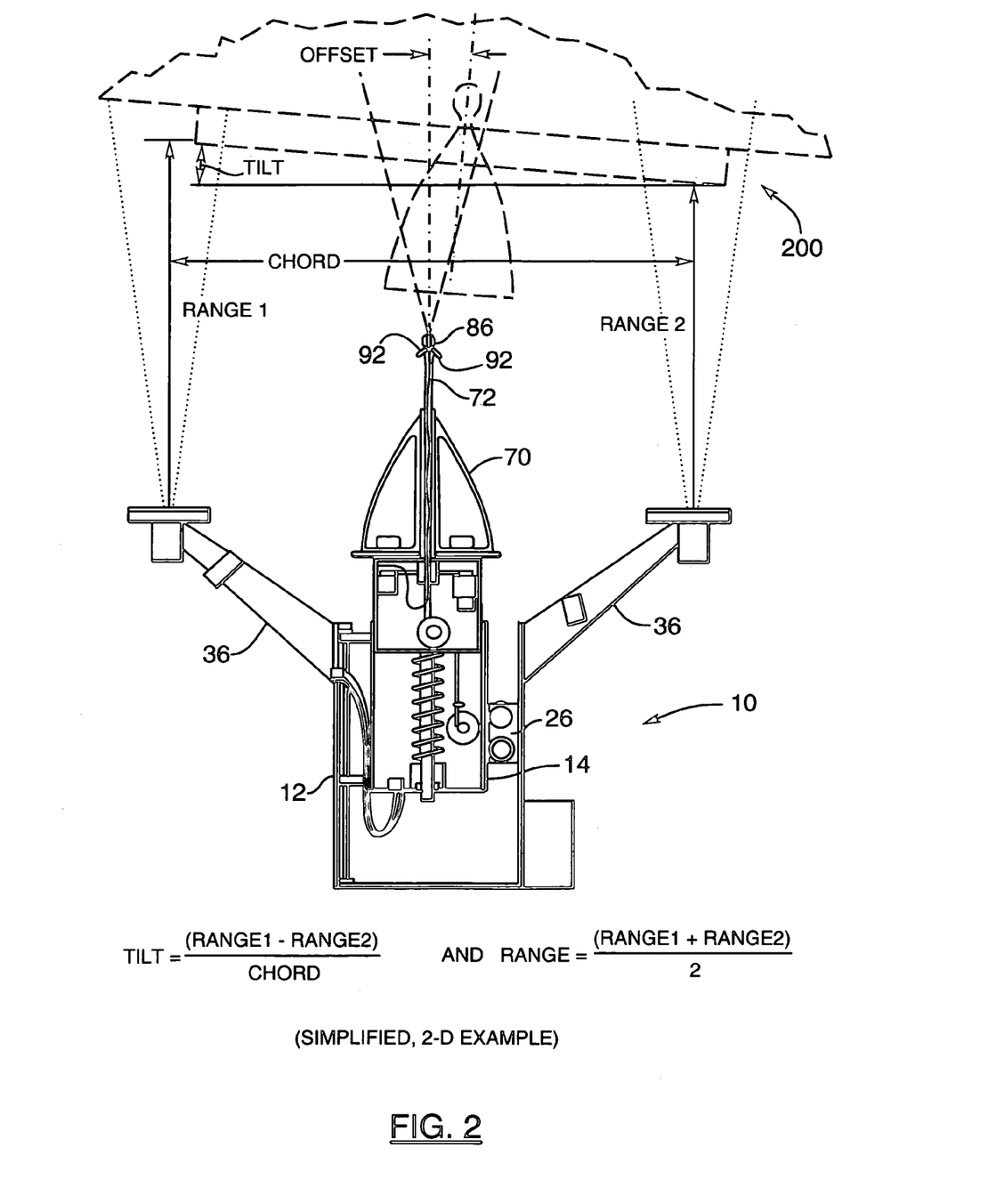
FIG. 2 is a cross sectional elevation view of the docking mechanism of FIG. 1 approaching a satellite to be captured by the docking mechanism.
Figure 3:
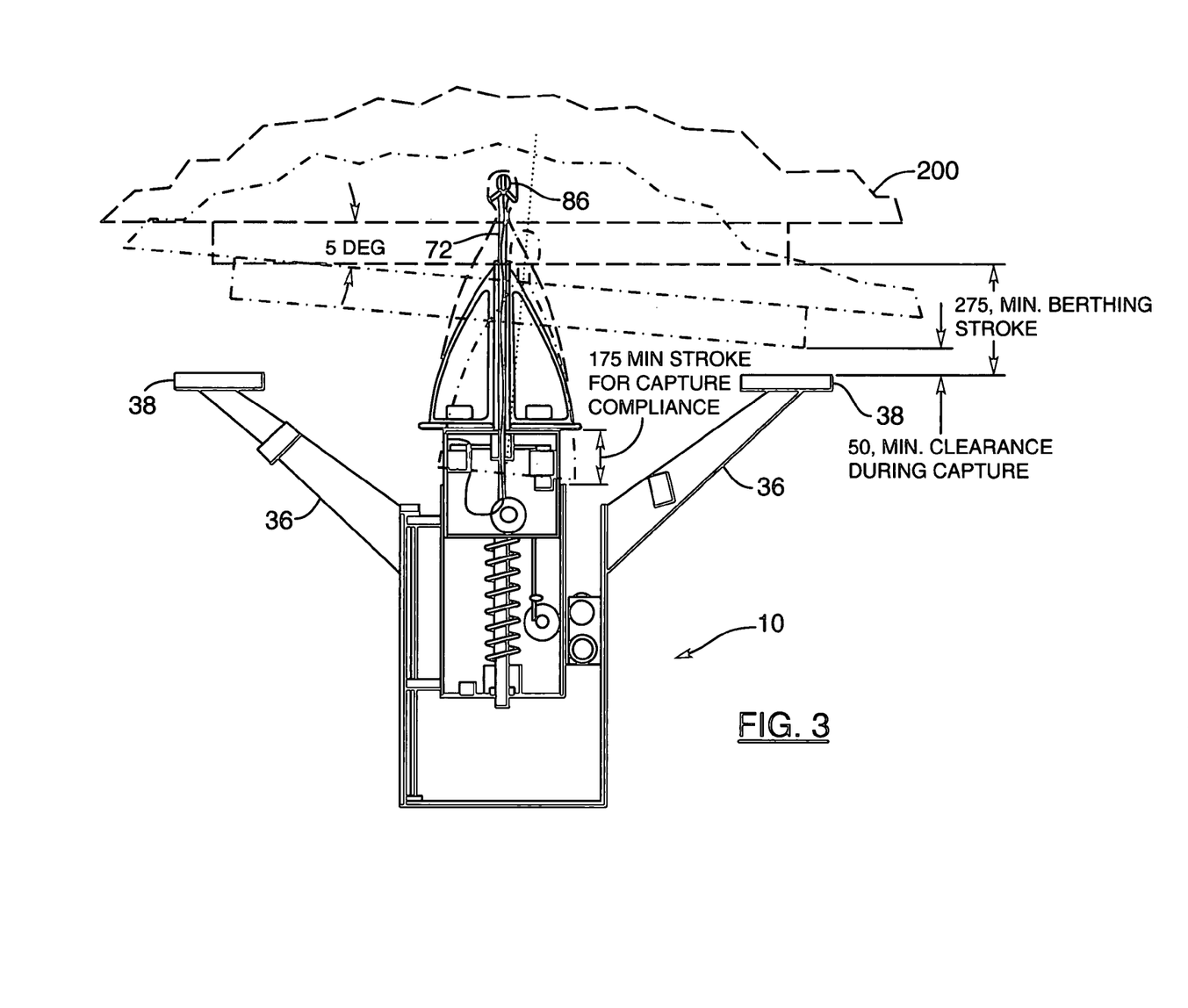
FIG. 3 is similar to FIG. 2 showing the docking mechanism capturing the satellite.
Figure 4:
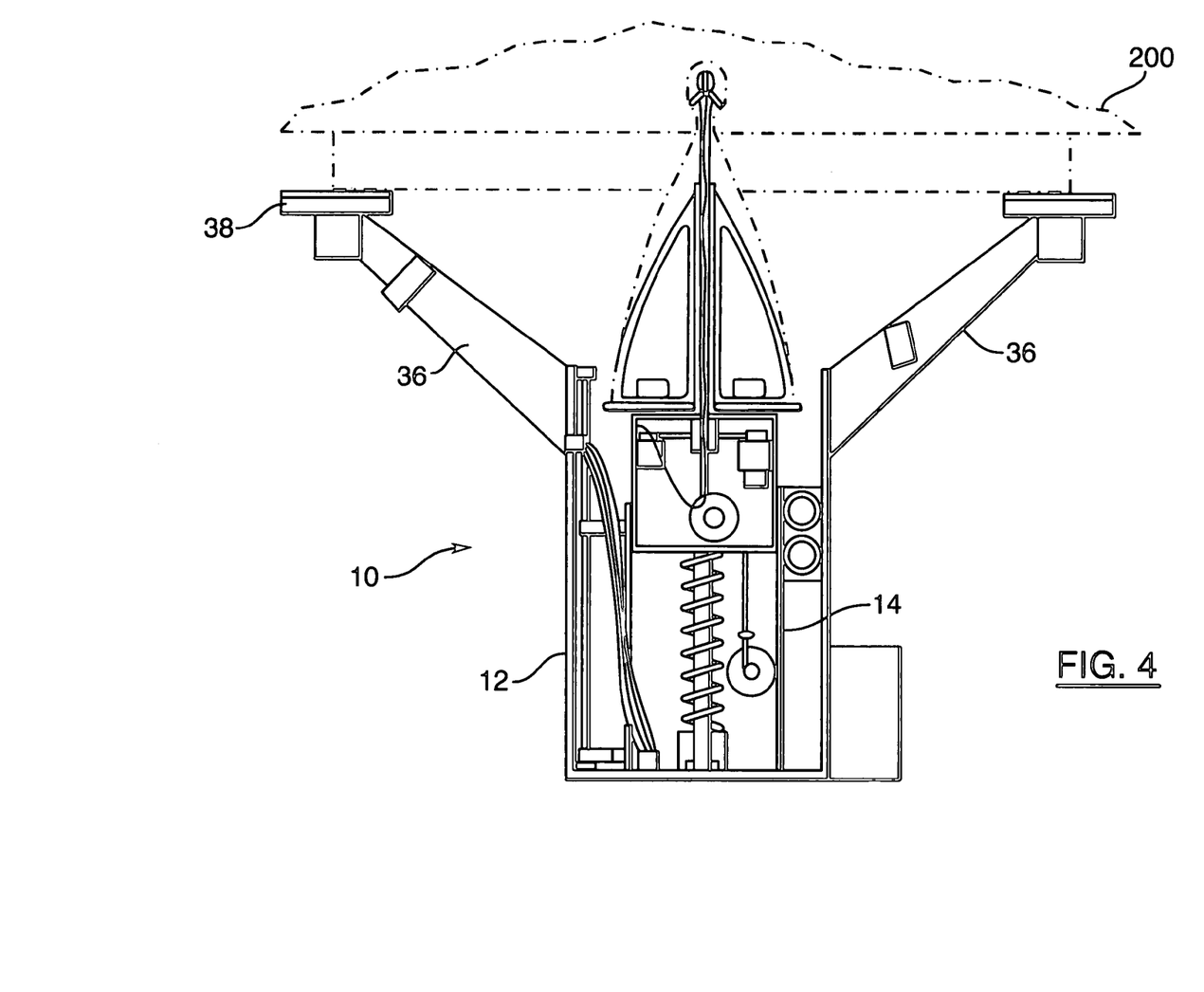
FIG. 4 is a cross sectional view showing the satellite captured by the docking mechanism and the two spacecraft locked together.

FIGS. 2, 3 and 4 show the approach and capture of satellite 200.

Figure 5:
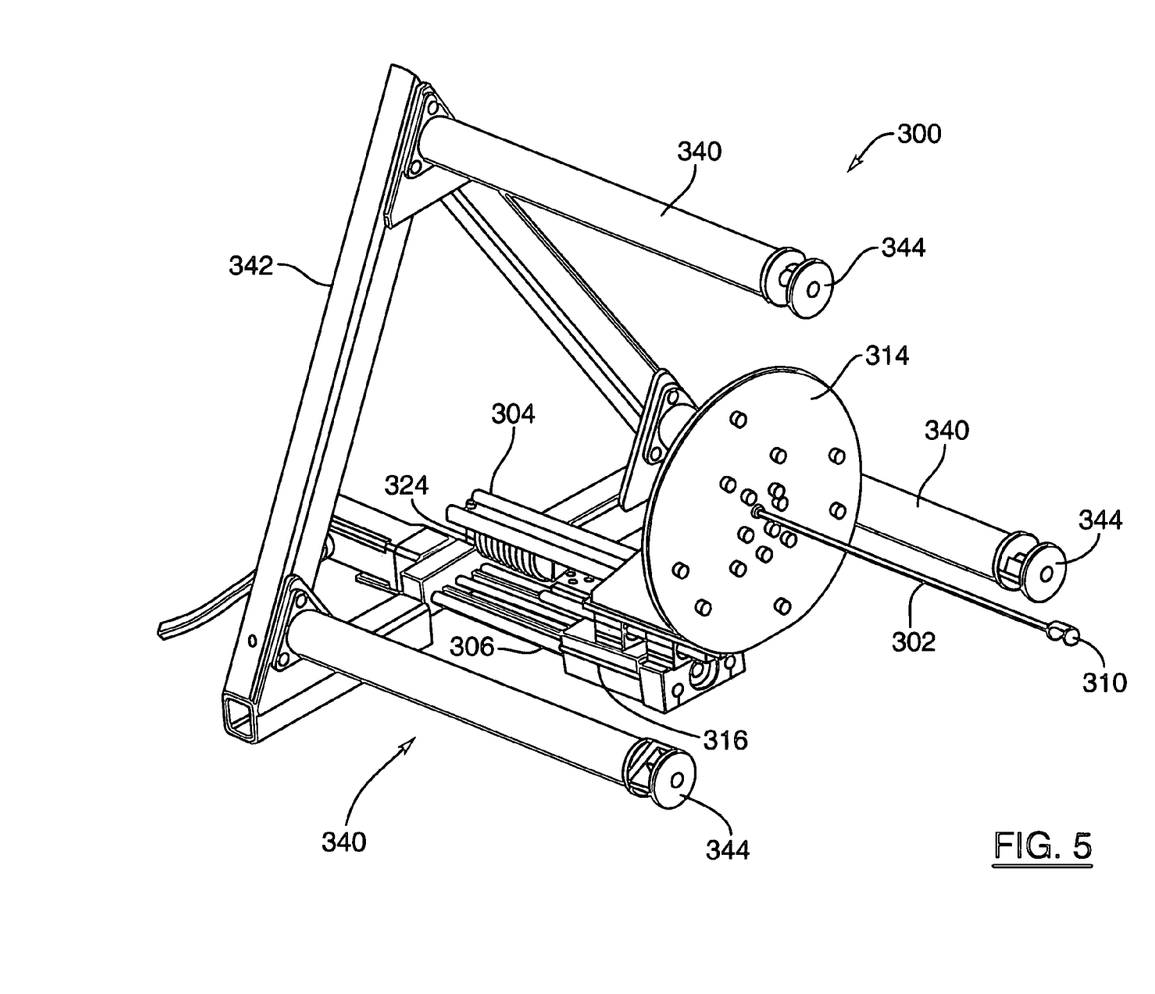
FIG. 5 is an isometric view of another embodiment of a docking mechanism constructed in accordance with the present invention.
Figure 6:
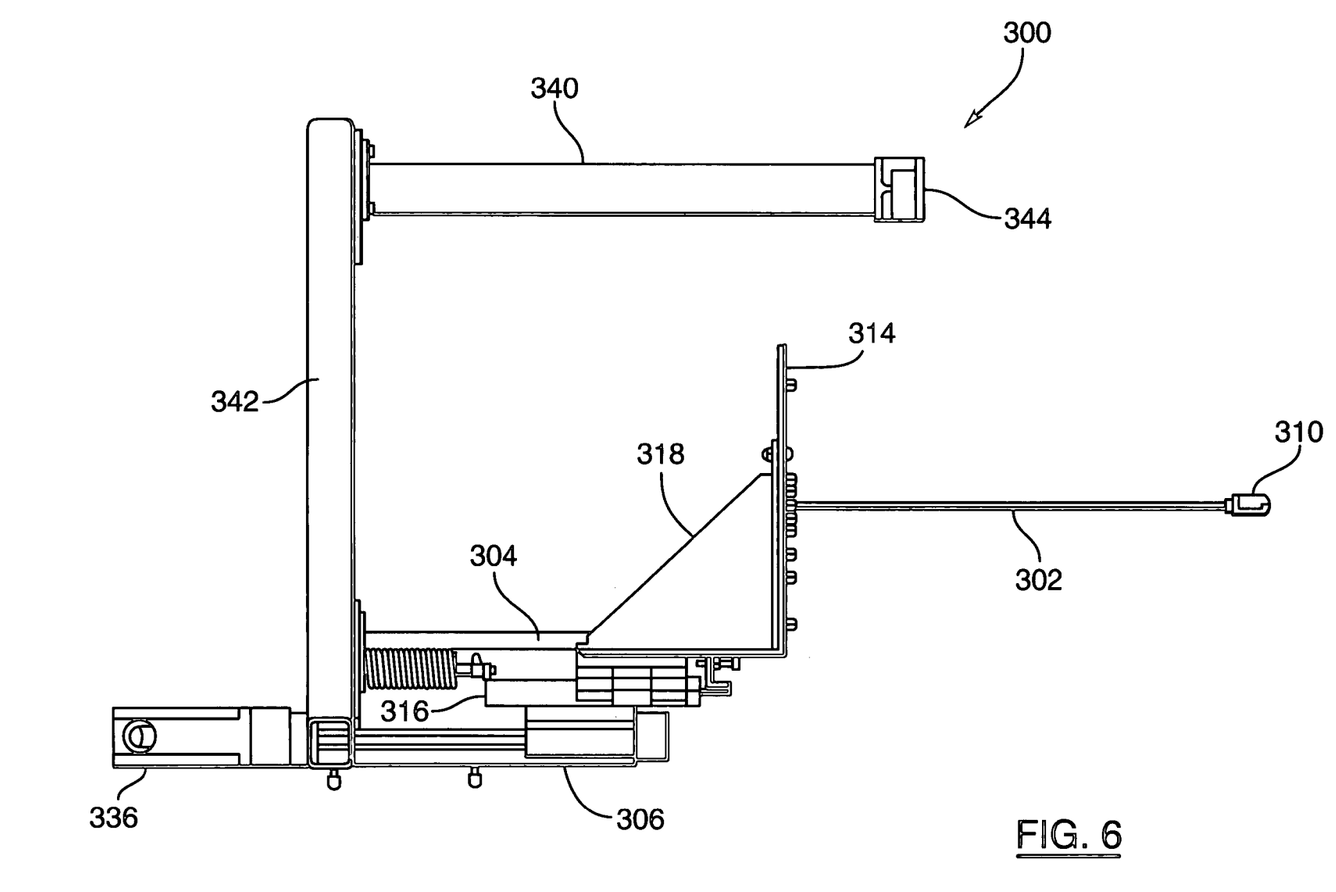
FIG. 6 shows a side view of the docking mechanism of FIG. 5.
Figure 7:
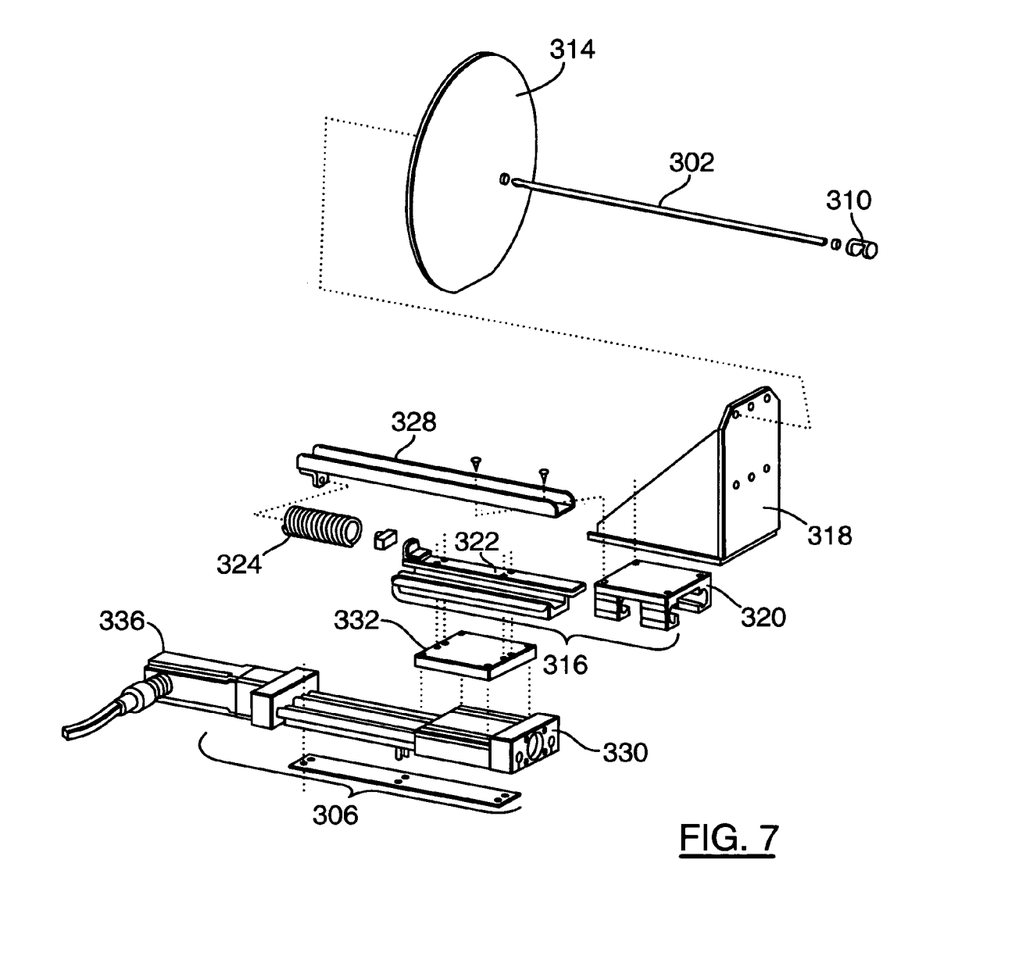
FIG. 7 shows an exploded view of the docking mechanism of FIG. 5.

FIGS. 5, 6, 7 and 8 illustrate another embodiment of a docking mechanism 300 constructed in accordance with the present invention. Docking mechanism 300 includes a flexible, compliant longitudinal probe 302, a compliance mechanism 304 and a berthing mechanism 306. A probe head assembly 310 is located at the end of compliant probe 302. With particular reference to FIGS. 5, 6 and 7, the probe consists of a probe head assembly 310 attached to one end of compliant probe shaft 302 which in turn is attached at the other end thereof to an abutment plate 314. The abutment plate 314 is mounted to compliance mechanism 304 which includes a linear guide 316 having a bracket 318 to which abutment plate 314 is secured. Linear guide 316 includes a slide bracket 320 on which bracket 318 is mounted with bracket 320 being slidably mounted on a bracket 322. A spring 324 is attached at one end thereof to one end of bracket 322 and at the other end thereof to the end of a bracket 328. Compliance mechanism 304 is mounted to berthing mechanism 306 which consists of a ball-screw actuated sliding stage 330. Bracket 322 in compliance mechanism 316 is fastened to top plate 332 which forms part of ball-screw actuated sliding stage 330. Three berthing posts 340 are rigidly attached to a frame 342 and each has an end portion 344 designed to engage an interface ring on an exterior surface of the target spacecraft being captured and serviced. It will be appreciated that only one (or two) berthing posts may be used instead of the three posts shown. The berthing mechanism 306 is driven using a motor 336 and an associated motor controller and software and its function is to provide relative movement between probe 302 and the rest of docking mechanism 300. Frame 342 is attached to the servicing spacecraft.

During capture of the spacecraft, the berthing mechanism 306 is first fully extended and then fixed in the extended position and the motion of the servicing spacecraft inserts the probe 302/probe head 310 into the thruster nozzle of the LAM on the spacecraft being captured. Once the fingers 356 on probe head 310 are deployed, the berthing mechanism 306 is retracted thereby retracting the probe 302 to lock the two spacecraft together.

Figure 8A:
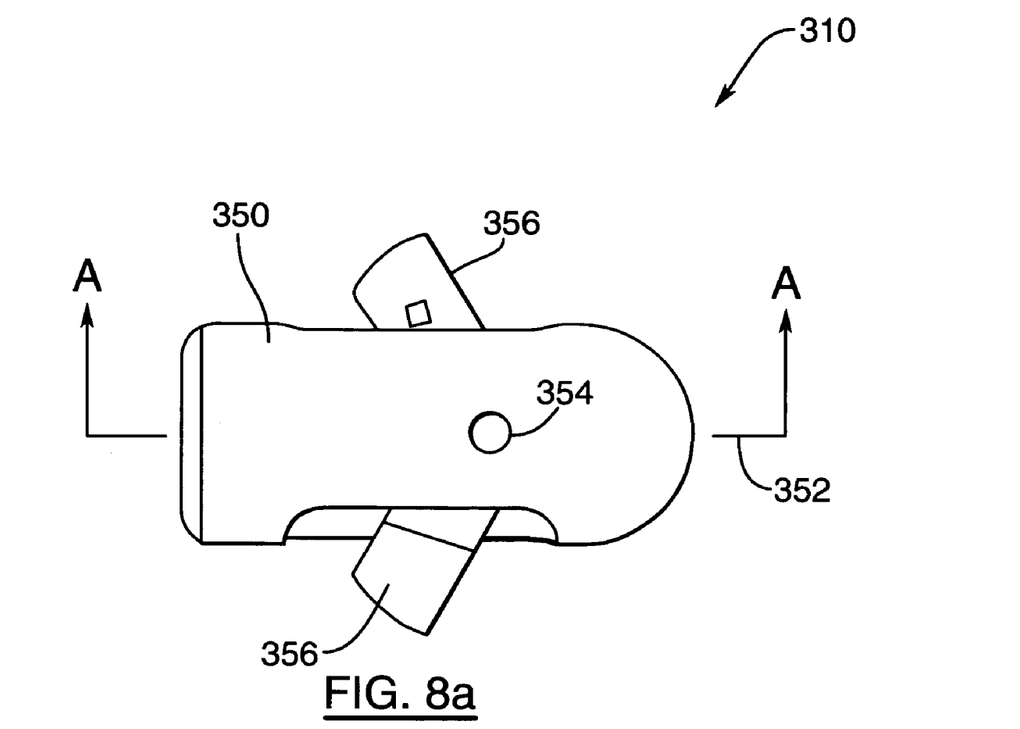
FIG. 8a shows a docking mechanism probe head assembly used in the docking mechanism of FIGS. 5, 6 and 7.
Figure 8B:
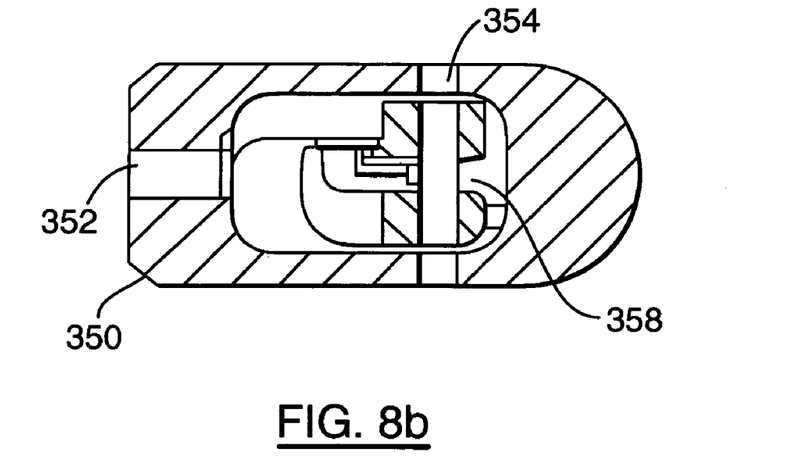

Referring now to FIGS. 8a and 8b, head assembly 310 includes a housing 350 having a longitudinal axis 352 with an axle 354 mounted across the housing perpendicular to the longitudinal axis. A pair of fingers 356 are mounted on the axle 354 and are normally biased open in the deployed position, using a torsion spring 358 located between the two fingers 356 on the axle 354, as best seen in FIG. 8b. As with docking mechanism 10 in FIG. 1, docking mechanism 300 may include proximity sensors mounted on the berthing posts 340 for sensing the distance between the posts and the interface ring of the target spacecraft during capture and coupling of the spacecraft. The berthing posts 340 may each include a camera mounted thereon for capturing images during capturing and coupling of the target spacecraft. The probe head assembly may also include a camera mounted thereon for capturing images of the probe head assembly during capturing and coupling of the target spacecraft and one or more lights may be mounted on the support frame for illuminating the apogee motor and target spacecraft. The docking mechanism may include a laser rangefinder mounted on the support frame or any of the berthing posts or alternatively it could be mounted on the servicing spacecraft itself.

A flexible web similar to web 82 in docking mechanism 10 of FIG. 1 may be used on docking mechanism 300 in FIG. 5.

During the mission to couple the two spacecraft, early in the rendezvous portion of the mission, the range may be determined by the servicing spacecraft using a ranging signal from the target satellite. Differential radio interferometry and orbital debris tracking information may also be used to plan minimum fuel approaches. The servicer spacecraft may employ a directional receiver array that provides bearing to the target spacecraft to provide for contingency operations. When the servicer spacecraft is within about 100 meters of the client spacecraft, a camera and a co-located laser range finder may be used to plot the final approach. The radio transponder data will continue to provide range information in the event that the video is interrupted by off-nominal lighting events or data dropouts. This maneuver will bring the servicer spacecraft to within 9 meters of the target spacecraft.

Docking, and undocking, may be accomplished with a suitably configured video camera (or cameras) and the laser range finder. The final portion of the docking maneuver is completed with the assistance of a boresight camera mounted in the tip of the docking mechanism. Accuracies of the optical docking system are on the order of 1 cm, 1 deg, 1 cm/sec, and 1 deg/sec. During docking, the docking probe head assembly 310 and part of elongate probe 312 is inserted into the Liquid Apogee Motor (LAM) of the target spacecraft with the berthing mechanism 306 fully extended so that compliant probe 302 with probe head assembly 310 is inserted into the throat of the LAM. The spring-loaded fingers 356 in the probe head 310 retract to clear the throat of the LAM then spring open once assembly 310 has passed through the throat of the LAM. The abutment plate 314 prevents the probe 302 from being inserted too far into the LAM. This provides capture retention of the target spacecraft. During the capture operation, natural damping is provided by the spring 324 and the friction in the linear guide 316 in compliance mechanism 304.

Once captured, the berthing mechanism 306 is commanded to retract until the docking mechanism berthing pads 344 on the ends of berthing posts 340 contact the launch vehicle interface ring on the target spacecraft. The berthing mechanism 306 continues to drive until the desired preload is achieved at the interface.

The present docking mechanism is very advantageous in that it uses optimized compliance and damping (including lateral compliance of the flexible probe tube) to control the contact forces such that tip off or sticking of the probe-apogee boost motors is avoided during alignment/insertion. The docking mechanisms disclosed herein use axial and lateral compliance to increase the duration for which the probe tip remains inside the LAM combustion chamber after insertion to give the capture fingers time to extend. The use of the lanyard to disengage the fingers for release permits the use of a compliant probe small enough to pass through the narrow throat and fit into the small combustion chamber of the LAM. The docking mechanism is also advantageous in its use of the launcher docking ring for final alignment and rigidization while exploiting the more benign capture characteristics of the LAM.

The docking mechanism disclosed herein is capable of interfacing with the LAM to allow a servicing spacecraft to dock with a satellite that has no special docking features. The docking mechanism disclosed herein may be used in many space applications including satellite rescue for capturing satellites stranded in the wrong orbits, satellite repositioning including orbital adjustments for satellites nearing the end of their life in order to save their propellant for attitude control and thus extend the useful life of the satellite, one example being inclination correction for GEO communications satellites. The docking mechanism is also useful for satellite servicing, repair, replenishment and/or upgrade of satellites in orbit.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A docking mechanism for capturing and coupling a target spacecraft to a servicing spacecraft, the target spacecraft having an Apogee Boost Motor (ABM) or Liquid Apogee Motor (LAM), comprising:
    a support frame which is attachable to the servicing spacecraft, and at least one elongate berthing post having first and second ends, the berthing posts being attached to the frame at said first ends, the at least one berthing post including a berthing pad attached to the second end thereof for contacting the target spacecraft being docked with the servicing spacecraft;
    a berthing mechanism attached to the support frame, the berthing mechanism including an extendable stage;
    a compliance mechanism mounted on the extendable stage of the berthing mechanism;
    a probe including an elongate flexible shaft having first and second ends, a probe head assembly attached to the first end of the longitudinal flexible shaft and the second end of the longitudinal flexible shaft being attached to an abutment plate, the abutment plate being attached to the compliance mechanism, the probe head assembly including fingers extendable laterally therefrom, the compliance mechanism providing kinetic energy absorption and damping of the docking mechanism during capture and coupling of the two spacecraft together for reducing overshooting and undershooting of the probe with respect to the apogee motor; and
    wherein during capture and coupling of the target spacecraft to the servicing spacecraft together the servicing spacecraft is positioned behind the thruster of an apogee rocket on the target spacecraft with the extendable stage in the fully extended position, and wherein the probe head assembly is extended into the thruster by movement of the servicing spacecraft and once it has been extended past a throat in the thruster, the fingers are deployed laterally therefrom and the extendable stage of the berthing mechanism is retracted until the berthing pads on the ends of berthing posts contact an interface ring on the target spacecraft.

2. The docking mechanism according to claim 1 wherein the berthing mechanism includes a ball-screw actuated sliding stage.

3. The docking mechanism according to claim 1 wherein the probe head assembly includes a lanyard connected at one end thereof to the fingers for retracting the fingers during disengagement of the probe from the apogee motor, the other end of the lanyard being connected to a retraction mechanism connected to the support frame.

4. The docking mechanism according to claim 1 wherein the berthing mechanism includes a motor connected to the extendable stage, a motor controller including a microprocessor and computer control instructions for controlling the probe during capture and disengagement of the servicing spacecraft from the target spacecraft.

5. The docking mechanism according to claim 1 wherein the compliance mechanism includes a linear guide and spring connected between the guide and the support frame.

6. The docking mechanism according to claim 1 wherein said at least one elongate berthing post is three elongate berthing posts.

7. The docking mechanism according to claim 1 wherein the at least one berthing post includes proximity sensors mounted thereon for sensing a distance between the posts and the interface ring of the target spacecraft.

8. The docking mechanism according to claim 1 wherein the at least one berthing post includes a camera mounted thereon for capturing images during capturing and coupling of the target spacecraft.

9. The docking mechanism according to claim 1 wherein the probe head assembly includes a camera mounted thereon for capturing images of the probe head assembly during capturing and coupling of the target spacecraft.

10. The docking mechanism according to claim 1 including a flexible web member extending outwardly from the abutment plate and disposed around the elongate flexible shaft.

11. The docking mechanism according to claim 1 including a light mounted on the support frame for illuminating the apogee motor and target spacecraft.

12. The docking mechanism according to claim 1 including a laser rangefinder mounted on the support frame.

13. A docking mechanism for capturing and coupling a target spacecraft to a servicing spacecraft, the target spacecraft having an Apogee Boost Motor (ABM) or Liquid Apogee Motor (LAM), comprising:
    a support frame which is attachable to the servicing spacecraft, and at least one elongate berthing post having first and second ends, the berthing posts being attached to the frame at said first ends, the at least one berthing post including a berthing pad attached to the second end thereof for contacting the target spacecraft being docked with the servicing spacecraft;
    a berthing mechanism attached to the support frame, the berthing mechanism including an extendable stage and a motor connected to the extendable stage, a motor controller including a microprocessor and computer control instructions for controlling the probe during capture and disengagement of the servicing spacecraft from the target spacecraft;

a compliance mechanism mounted on the extendable stage of the berthing mechanism;

a probe including an elongate flexible shaft having first and second ends, a probe head assembly attached to the first end of the longitudinal flexible shaft and the second end of the longitudinal flexible shaft being attached to an abutment plate, the abutment plate being attached to the compliance mechanism, the probe head assembly including fingers extendable laterally therefrom, the compliance mechanism providing kinetic energy absorption and damping of the docking mechanism during capture and coupling of the two spacecraft together for reducing overshooting and undershooting of the probe with respect to the apogee motor; and wherein during capture and coupling of the target spacecraft to the servicing spacecraft together the servicing spacecraft is positioned behind the thruster of an apogee rocket on the target spacecraft with the extendable stage in the fully extended position, and wherein the probe head assembly is extended into the thruster by movement of the servicing spacecraft and once it has been extended past a throat in the thruster, the fingers are deployed laterally therefrom and the extendable stage of the berthing mechanism is retracted until the berthing pad on the ends of berthing posts contact an interface ring on the target spacecraft.

14. The docking mechanism according to claim 13 wherein the at least one berthing post includes proximity sensors mounted thereon for sensing a distance between the posts and the interface ring of the target spacecraft.

15. The docking mechanism according to claim 13 wherein the at least one berthing post includes a camera mounted thereon for capturing images during capturing and coupling of the target spacecraft.

16. The docking mechanism according to claim 13 wherein the probe head assembly includes a camera mounted thereon for capturing images of the probe head assembly during capturing and coupling of the target spacecraft.

17. The docking mechanism according to claim 13 including a laser rangefinder mounted on the support frame.

18. The docking mechanism according to claim 13 wherein the probe head assembly includes a lanyard connected at one end thereof to the fingers for retracting the fingers during disengagement of the probe from the apogee motor, the other end of the lanyard being connected to a retraction mechanism connected to the support frame.

* * * * *